Sept. 7, 1943.  R. L. WILCOX  2,328,699
TRANSFER MECHANISM
Filed April 2, 1942  3 Sheets-Sheet 1

INVENTOR
Richard Lester Wilcox
BY
ATTORNEY

Sept. 7, 1943.  R. L. WILCOX  2,328,699
TRANSFER MECHANISM
Filed April 2, 1942  3 Sheets-Sheet 2
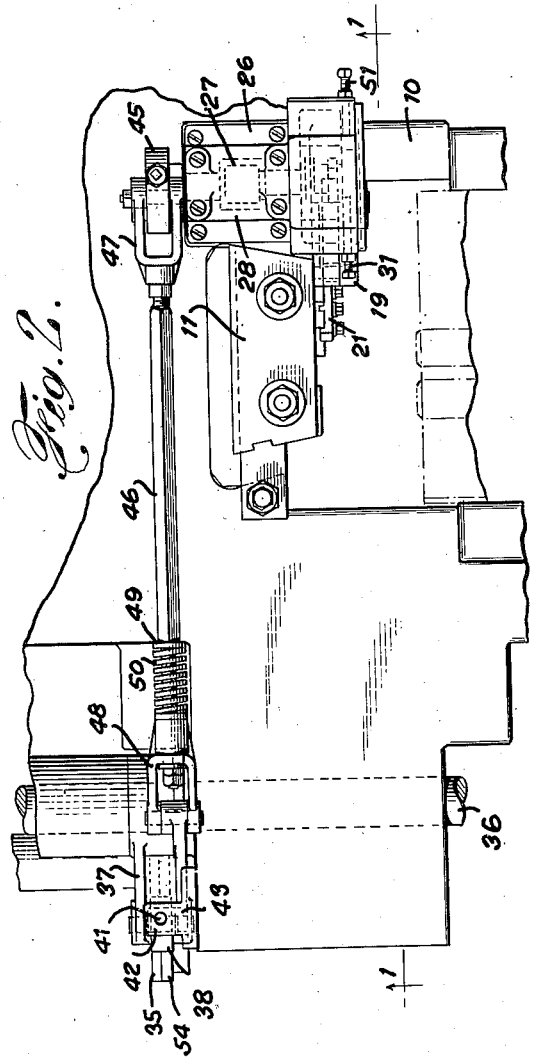
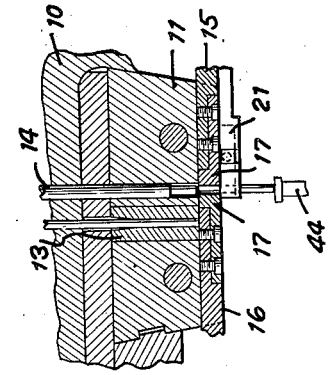
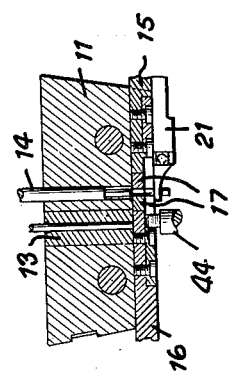
INVENTOR
Richard Lester Wilcox
BY
ATTORNEY

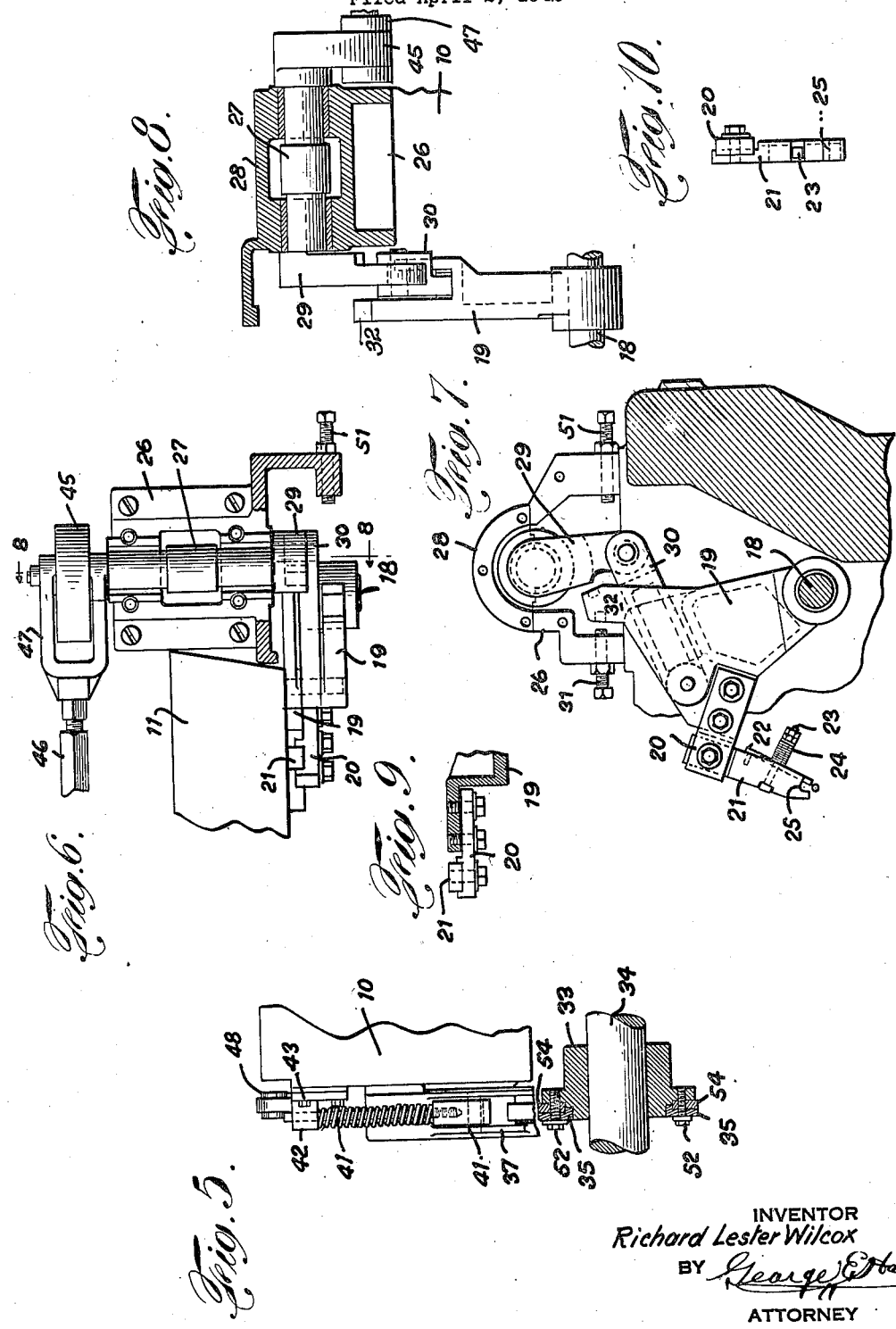

Patented Sept. 7, 1943

2,328,699

UNITED STATES PATENT OFFICE 2,328,699

TRANSFER MECHANISM

Richard Lester Wilcox, Waterbury, Conn., assignor to The Waterbury Farrel Foundry and Machine Company, Waterbury, Conn., a corporation of Connecticut Application April 2, 1942, Serial No. 437,418

15 Claims. (Cl. 10—12)

This invention relates to new and useful improvements in transfer mechanism, particularly such mechanism as is associated with a header, upsetting machine or the like, although applicable for use with other types of machines.

In the header or upsetting machine herein illustrated in part, the wire line and the push-out line are in the same plane, preferably horizontal, and the fabricating or working die is in a lower horizontal plane.

In mechanism of this character workpieces are severed successively from a wire length at the wire line (cut-off die), and then carried to the push-out line where the workpiece is projected into transfer mechanism and carried into line with the fabricating die.

The principal object of this invention is to provide a transfer mechanism independent of cut-off mechanism, that will receive the work-piece, grasp and hold it rigidly against relative movement, present it in line with the fabricating die or other tool, and release its grip or hold on the workpiece as the workpiece is partially projected into the die a sufficient distance to support it, and thereafter return for another workpiece.

Another object of this invention is to make the transfer mechanism as light as the labor thereon will permit and thereby aid in its rapid movement, to the end that the speed and output of the machine with which it is associated may be increased.

A further object is to position the mechanism with respect to other parts that it may be readily assembled therewith and adjusted with the minimum labor and inconvenience.

Other objects will be apparent from the following description and accompanying drawings.

Referring to the drawings in which like numerals indicate like parts in the several figures;

Figure 2 is a fragmentary plan view of a portion of the header frame with this improved transfer mechanism associated therewith;

Figures 3 and 4 are transverse sectional views of the die block, cut-off die and push-out mechanism, the parts in section being taken generally upon a plane extending through the centers of the cut-off die and push-out mechanisms;

Figure 5 is a view of a portion of the header frame, feed cam and lever mechanism;

Figure 6 is a view of a portion of the transfer mechanism;

Figure 7 is an enlarged view of the finger carrier and adjacent parts;

Figure 8 is a transverse view of that portion of the transfer mechanism shown in Figure 6, the parts in section being taken generally upon line 8—8 of Figure 6;

Figure 9 is a view of a portion of the transfer mechanism, the parts in section being taken generally upon line 9—9 of Figure 1; and Figure 10 is a view of the workpiece gripping portion of the transfer mechanism.

Figure 1:
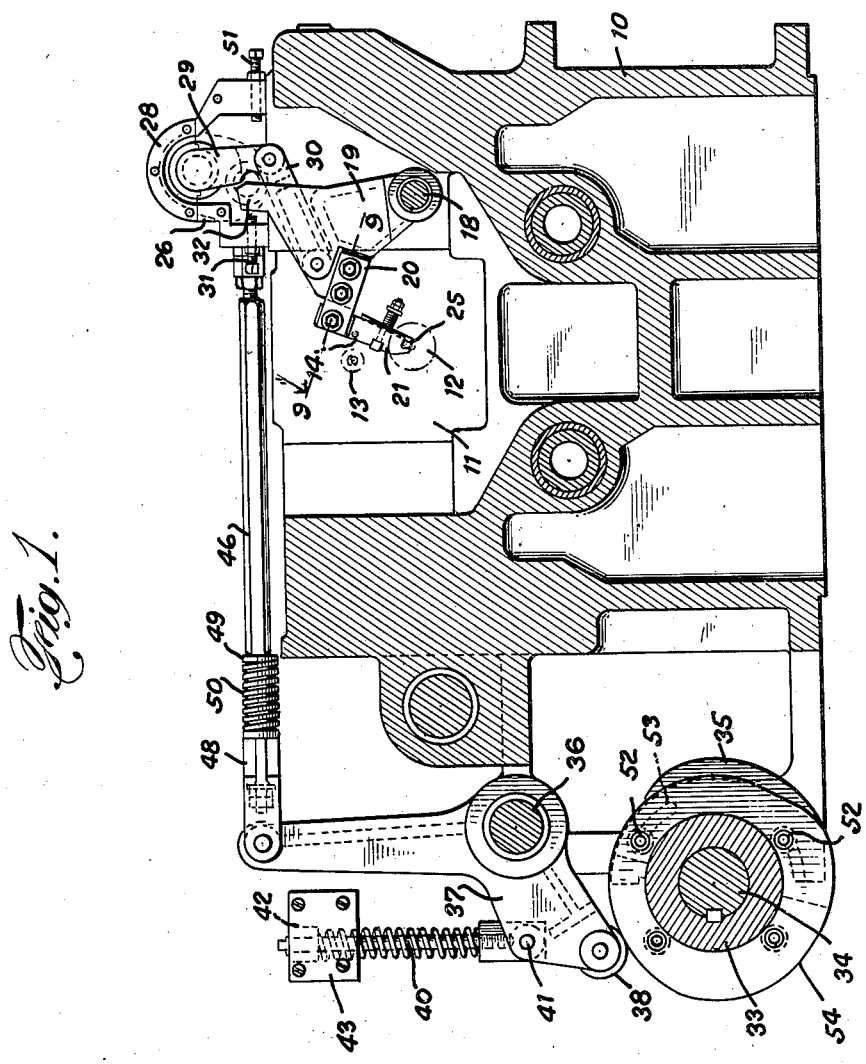
Figure 1 is a transverse sectional view of a header or the like with this improved transfer mechanism associated therewith and the die block shown only in outline.

In the drawings, the numeral 10 indicates the frame of a header, upsetting machine or the like; 11 a die block; 12 a fabricating die secured therein; 13 a cut-off die shown herein as being in the same horizontal plane as the push-out or knock-out pin 14.

Movable on the face of the die block 11 are two slides 15 and 16, each carrying a cutter 17. The details of these slides and cutter mechanism constitutes no part of this application, as any form of cut-off mechanism may be utilized equally as well as that illustrated.

Journaled on the shaft 18, in the frame 10, is a rock arm 19, to which is secured a finger block 20, carrying a finger 21.

On the finger is a latch 22 held by a bolt 23 under the tension of a spring 24. In the end of the finger 21 is a notch 25, open at one side, and over which projects an end of the latch 22, thus forming an opening for the reception of a workpiece. The finger block 20 is adjustable on the rock arm 19 and the finger 21 on the finger block 20, and whereby the notch 25 may be moved into alignment with the opening in the fabricating die 12, and thus present the workpiece into position whereby its axis is coincident with that of said opening.

Fixed on the frame 10 is a bracket 26, having a cap 28, which provides a journal for the rock shaft 27. On one end of the shaft 27 is an arm 29 which is connected with the rock arm 19 by a link 30. Stop screws 31 and 51 threaded in the bracket 26 or other fixed part are in the path of and engaged by the lug 32 on the rock arm 19, which thereby limit the extent of movement thereof. The link 30 has a substantially reciprocating movement, in one direction pushing the finger arm 21, and in the other direction pulling the same.

On a side shaft 34 is a cam hub 33, to which is secured a cam 54 and a cam segment 35 by the screws 52.

Journaled on the pin 36, fixed in the frame 10 or other rigid part, is a rock arm 37, carrying a cam roll 38, held in contact with the faces of the cam 54 and cam segment 35, by a rod 40 connected by the pintle 41 with the rock arm 37 and slidable within a nut 42 in the bracket 43 secured to a fixed part, and a spring surrounding the rod.

Between the rock arms 37 and 45 on the shaft 27 is an adjustable connection, comprising a rod 46, secured by a yoke 48 to the rock arm 37. Between the yoke 48 and a collar 49 on the rod 46 is a spring 50, which will yield, if necessary, when the lug 32 is in contact with the stop screw 51.

The timing of the transfer is such that the finger 21 is quickly withdrawn from in front of the fabricating die 12, and this withdrawal either accelerated or retarded to clear the advancing punch. This is especially desirable so that very short length workpieces may be accommodated. For cutting off workpieces that are longer than the thickness of the cutters, the notch 25 is carried above the pushout station. When in such position it dwells while the workpiece between the cutters is carried over from the cut-off station in front of the pushout pin 14. The finger then moves down and snaps onto the workpiece which rests in the notch 25 under a slight pressure from the latch 22. After the blank has been pushed entirely out of the cutters and into the notch 25, the pusher pin 14 is withdrawn quickly and the rock arm 19 swings to the left, as shown in Figure 1, causing the finger 21 to swing downwardly carrying the workpiece in the notch 25 into register with the fabricating die 12. The cam 54 and cam segment 35 are utilized and relatively adjusted for transferring both short and long workpieces. When transferring a workpiece shorter in length than the thickness of the cutters, the notch in the finger 21 is brought into register with the push-out station and the spring 50 is compressed to permit a full stroke of the cam 54 and cam segment 35. When cutting off workpieces longer than the thickness of the cutters, the stop screw 51 is not utilized and the full stroke of the cam 54 and cam segment 35 is used as above described. The cam segment 35 is adjustable on the cam 54 through the screws 52 and slots 53, to give an adjustment of timing to the rock arm 19, so that the finger 21 can be returned from the fabricating die 12 earlier or later as may be required. In Figure 3 the finger 21 is illustrated as being reduced in thickness to accommodate relatively short blanks and the feed stop 44 is positioned closer to the die block than is the feed stop illustrated in Figure 4.

All of the parts of this transfer mechanism are relatively light in weight, as the only labor required of them is to carry the workpiece from one station to another. This action is made easier by the fact that the arm 19 rotates upon the shaft 18 instead of being fixed thereon and actuated thereby as is usual in swinging transfer arms heretofore made. The power requisite to swing the arm 19 is applied through the link 30 which is connected with the arm 19 at a point distant from its axis of rotation and in line with the finger 21. Thus the workpiece is carried from the station where received in the notch 25 to the fabricating die by an element, for all practical purposes in direct line therewith, and the finger 21 returns to its former position by a direct pull through the same element.

Within the scope of the appended claims, changes and alterations may be made in the embodiment of this invention, other than that herein illustrated.

What is claimed is:

1. In combination with a header frame having a shaft therein and plural dies spaced from each other; a swinging arm journaled upon said shaft; a finger on said arm that during the movement of the swinging arm in one direction will carry a workpiece from one of said dies to another of said dies; means for actuating the swinging arm, comprising in part a rock shaft; and a link connection between the rock shaft and swinging arm, the said finger being movable in a path laterally of a line passing through the axis of the rock shaft and the axis of rotation of the swinging arm.

2. In transfer mechanism: a swinging arm journaled upon a shaft or the like: a finger block thereon: a finger on the finger block to carry a workpiece from one station to another: a rock shaft: a connecting element between the rock shaft and swinging arm having connection with the swinging arm at a point distant from its axis of rotation, for actuating said arm, said finger having a two-direction adjustment relative to the swinging arm.

3. In transfer mechanism; a swinging arm journaled upon a shaft or the like; a finger thereon to carry a workpiece from one station to another; and means for actuating the swinging arm, comprising in part a rock shaft; a link between the rock shaft and swinging arm having connection with the swinging arm at a point distant from its axis of rotation the said finger being movable in a path laterally of a line passing through said axis of rotation and the axis of the rock shaft.

4. In transfer mechanism; a swinging arm journaled upon a shaft or the like; a finger thereon to carry a workpiece from one station to another; a rock member; a swinging arm; means between the rock member and swinging arm for transmitting motion from the former to the latter, said means being connected with the swinging arm at a point distant from the axis of rotation of the swinging arm; and adjustable means to limit the extent of movement of the swinging arm.

5. In transfer mechanism; a swinging arm journaled upon a shaft or the like; a finger thereon to carry a workpiece from one station to another; means for actuating the swinging arm, comprising in part a rock member, an oscillating shaft, and a link between the rock member and swinging arm having engagement with the swinging arm at a point distant from its axis of rotation; and adjustable means to limit the extent of movement of the swinging arm.

6. In transfer mechanism: a swinging arm journaled upon a shaft or the like: a finger thereon to carry a workpiece: a rock member: means for actuating the swinging arm connected with the rock member and to the swinging arm at a point distant from its axis of rotation: and adjustable members in the path of movement of said swinging arm to limit the extent of movement of the swinging arm in both directions.

7. In transfer mechanism; a swinging arm journaled upon a shaft or the like; a finger thereon to carry a workpiece from one station to another; a variably shaped cam; means for actuating the swinging arm from the cam, comprising in part a rock member, a rock shaft, a connection between the rock member and rock shaft, and a link between the rock shaft and swinging arm.

8. In combination with a header, upsetting machine or the like having a push-out station; a rock shaft journaled in a plane above that of the push-out station; a rock arm journaled in a plane below the push-out station; a finger to carry a workpiece associated with the rock arm; and a connection between the rock shaft and rock arm, joined with the rock arm at a point distant from its axis of rotation.

9. In combination with a header frame, having plural operation stations; means for transferring a workpiece from one station to another station, comprising in part plural rock members, the axes of rotation of which are spaced from each other; and a finger connected with one of the rock members, and movable in a path upon one side of a line passing through said axes of rotation.

10. In combination with a header frame, having plural operation stations; means for transferring a workpiece from one station to another station, comprising in part plural rock members, the axes of rotation of which are spaced from each other; a link between the rock members; and a finger connected with one of the rock members movable in a path laterally of a line passing through said axes of rotation.

11. In combination with a header frame, having plural operation stations; means for transferring a workpiece from one station to another station, comprising in part plural rock members, the axes of rotation of which are spaced from each other; a link between the rock members and connected therewith at opposite ends; and a finger connected with one of the rock members and movable in a path laterally of a line passing through said axes of rotation.

12. In combination with a header frame, having plural operation stations; means for transferring a work piece from one station to another station, comprising in part plural rock members, the axes of rotation of which are spaced from each other; a finger connected with one of the rock members and movable in a path laterally of a line passing through said axes of rotation; and stop means for limiting the extent of movement of the rock members.

13. In combination with a header frame, having plural operation stations; means for transferring a workpiece from one station to another station, comprising in part plural rock members, the axes of rotation of which are spaced from each other; a link between the rock members; a finger connected with one of the rock members movable in a path laterally of a line passing through said axes of rotation; and positive means for actuating one of said rock members and through the link the other of said rock members.

14. In combination with a header frame, having plural operation stations; means for transferring a workpiece from one station to another station, comprising in part plural rock members, the axes of rotation of which are spaced from each other; a block on one rock member; a finger on the block, these being adjustable relative to each other, said finger being movable in a path laterally of a line passing through said axes of rotation.

15. In combination with a header frame, having plural operation stations; means for transferring a workpiece from one station to another station, comprising in part plural rock members, the axes of rotation of which are spaced from each other; and fingers on one of the rock members movable in an arcuate path laterally of a line passing through both of said axes.

RICHARD LESTER WILCOX.